United States Patent [19]

Rarick

[11] Patent Number: 5,140,246
[45] Date of Patent: Aug. 18, 1992

[54] HIGH PERFORMANCE HIGH SPEED STARTER FOR AN X-RAY TUBE ROTOR

[75] Inventor: Thomas L. Rarick, Mayfield Hts., Ohio

[73] Assignee: Picker International, Inc., Highland Hts., Ohio

[21] Appl. No.: 489,465

[22] Filed: Mar. 6, 1990

[51] Int. Cl.$^5$ .................. H02P 1/44; H05G 1/34
[52] U.S. Cl. .................... 318/779; 318/794; 318/254; 378/109; 378/131
[58] Field of Search ............ 378/101–102, 378/109–111, 131–132; 388/814, 844; 318/706, 808, 803–805, 779, 742, 254, 78, 823, 817, 794; 322/28, 47

[56] References Cited

U.S. PATENT DOCUMENTS

| | | | |
|---|---|---|---|
| 3,568,016 | 10/1968 | Barber | 318/78 |
| 3,727,122 | 4/1973 | Hughes et al. | 322/28 |
| 3,969,659 | 7/1976 | Thode | 318/823 |
| 4,060,753 | 11/1977 | Okuyama et al. | 318/254 |
| 4,160,940 | 7/1979 | Wolf | 318/808 |
| 4,207,508 | 6/1980 | Habisohn | 318/779 |
| 4,291,263 | 9/1981 | Stevenson et al. | 318/706 |
| 4,349,772 | 9/1982 | Weiss | 318/803 |
| 4,775,992 | 10/1988 | Resnick et al. | 378/110 |
| 4,829,551 | 5/1989 | Resnick et al. | 378/131 |
| 4,959,573 | 9/1990 | Roberts | 318/817 |
| 5,039,933 | 8/1991 | Dong | 322/47 |

Primary Examiner—William M. Shoop, Jr.
Assistant Examiner—John Cabeca
Attorney, Agent, or Firm—Fay, Sharpe, Beall, Fagan, Minnich & McKee

[57] ABSTRACT

A sationary rotatable anode (42) of an x-ray tube (10) is electrically connected to a high speed starter (24). The starter (24) includes an inductive rotor (44) connected to the anode (42), a main stator winding (50) and an auxiliary stator winding (52). The rotor (44) is driven by a power drive circuit (26) which is part of the starter (24). A main capacitor (64) is placed in series with the main winding for reducing its inductance. An auxiliary capacitor (66) is placed in series with the auxiliary winding for maintaining a selective impedance. A control circuit (90) is included in the starter (24) to control the main current and auxiliary current so that as the rotation of the rotor (44) increases, the control circuit (90) lowers the frequency of the main current and the auxiliary current passing to the main and auxiliary windings.

14 Claims, 8 Drawing Sheets

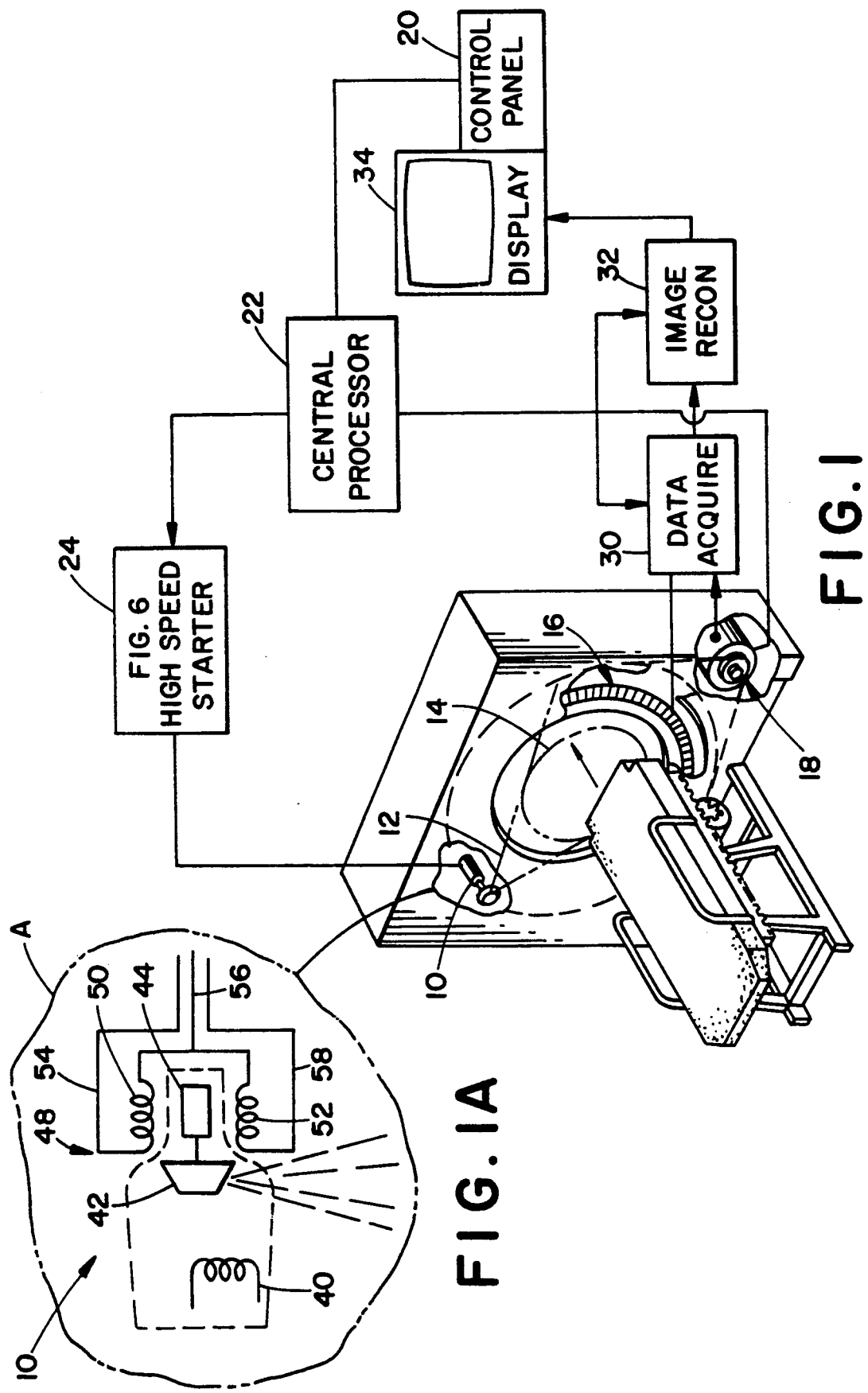

HIGH PERFORMANCE HIGH SPEED STARTER FOR AN X-RAY TUBE ROTOR

BACKGROUND OF THE INVENTION

The present invention relates to the electrical starter and medical diagnostic arts. It finds particular application for rapidly starting rotation of an x-ray tube anode. Rotating anode x-ray tubes are commonly found in conventional x-ray machines and computer tomographic scanners. It is to be appreciated, however, that the invention may also find application in digital x-ray scanners, other x-ray medical and non-medical devices, other motor and rotation speed control applications, and the like.

X-rays are produced when, in a vacuum, electrons are released, accelerated, and then abruptly retarded such as by impacting a target. In a conventional x-ray tube, a heating current, commonly on the order of 2–5 amps, is applied through a thermionic filament to create a surrounding electron cloud (i.e. released electrons). A high potential, e.g. 50–150 kilovolts, is applied between the filament and an anode to accelerate the electrons from the cloud to an anode target area. This acceleration of electrons causes a tube or anode current which is commonly on the order of 5–200 milliamps. To avoid thermal energy released as the electron hit the target area from overheating the anode, the anode rotates at a high speed during x-ray generation. When no x-rays are being generated, the anode may be allowed to decelerate. In a conventional x-ray device, after each x-ray photograph is taken, the anode is decelerated or braked to a stop and is restarted for the next photograph.

In a computed tomography scanner, the x-ray tube is rotatably mounted radially outward of an imaging region and opposite to a plurality of sensors. Commonly, a fan beam of x-rays is generated by the tube, passes through a subject, and impinges on the sensor array. Each time the x-ray tube is rotated about the subject, the sensors generate a series of views or scan from which an image is reconstructed. Before the x-ray beam can generate x-rays to start a scan, the anode must be brought up to its operating speed. After each set of image data is collected, the x-ray tube is turned off to stop generation of x-rays. If another scan is to follow quickly, the anode may be kept rotating at full speed between scans. Historically, however, after most scans, the anode was permitted to slow or stop. Thus, the x-ray tube anode goes through frequent accelerate and decelerate cycles.

The rotating anode of an x-ray tube has one or more natural resonant frequencies, i.e. angular velocities at which the anode vibrates excessively. The vibration may damage the anode, as well as shorten bearing life. It is accordingly, desirable to minimize the time spent at the resonant angular velocity during the start up time of the x-ray tube.

A single phase, one capacitor starter, employs a 180 Hz single phase invertor, which is utilized to bring the anode up to approximately 9000 RPM. This starter consists of a single 180 Hz invertor with a single output voltage. The starter output voltage is connected to a stator main winding directly and to an auxiliary winding through a series phase shifting capacitor. The capacitor causes the current in the auxiliary winding to lead the current in the main winding thereby producing output torque. However, the lead current is much less than an optimum phase shift of 90°.

A second type of rotor control, a bi-phased invertor, consists of two independent inverters running at 90° phase shift. The output of one invertor is connected directly to the main winding and the other output is connected directly to the auxiliary winding. The bi-phased inverter drive circuit described in U.S. Pat. No. 4,829,551 of Resnick et al., provides for selective variation of the drive frequencies, i.e. a rotor speed controller.

Because a wide range of x-ray tubes with widely varying motor characteristics may be used with the starter, phase shift and ampere turn matching of the anode motor windings is often far from optimal. Multiple capacitors are commonly switched in and out to improve the matching for different stators and operating frequencies. As the current level in the windings change, the windings change temperature. The phase and relative magnitude of the current through the windings change correspondingly. This increases excessively the current necessary to accelerate the rotor to its operating speed in the short time allotted and to maintain the correct operating speed.

Both of the above mentioned drive circuits contain various undesirable characteristics during acceleration of the anode of an x-ray tube. The single phase, one capacitor starter demands a high volt-amp input from the main supply due to its poor efficiency of starting. The auxiliary winding conventionally includes fewer turns than the main winding and is wound of smaller wires. As a result, the auxiliary winding current is inherently more nearly in-phase with the line voltage than that of the main winding causing the phase difference to be significantly less than the desired 90° reducing starting torque. The small phase difference between the two winding currents makes the starting line current, which is the sum of the two winding currents, quite high. Additionally, since the single phase invertor has no way of determining the rotor speed, normal operation is to apply full power for a time period which is longer than necessary to bring the anode up to speed. This excess start time increases the heat input to the motor windings.

The bi-phase invertor motor control which is a no capacitor starter requires a long accelerating time due to an inadequate power factor. Normal operation for the bi-phase invertor also includes applying power for a period of time which is more than adequate to bring the anode up to speed, again causing excessive heat in the motor windings. Additionally, the longer acceleration time causes the anode to reside longer at mechanical resonance frequencies thereby causing faster degradation of the anode.

The present invention contemplates a new and improved method and apparatus for high-speed starting and stopping of an anode rotor in an x-ray tube, which overcomes the above referenced problems and others.

SUMMARY OF THE INVENTION

In accordance with the one aspect of the present invention, there is provided a high-speed starter for starting rotation of an anode in an x-ray tube. The starter includes an inductive rotor connected to the anode and a main stator winding and an auxiliary stator winding. A main capacitor is placed in series with the main winding for reducing its inductance. An auxiliary capacitor is placed in series With the auxiliary winding for maintaining a selected impedance. Finally, a control circuit or phase locked loop circuit is included in the starter to control the main current and auxiliary current such that as the rotor rotation increases, the control circuit or phase locked loop circuit lowers the frequency of the main current and the auxiliary current passing to the main and auxiliary windings, respectively.

In accordance with a more limited aspect of the invention, a means is provided to sense a preselected speed of the rotatable anode.

In accordance with another more limited aspect of the invention, the main current and auxiliary current are maintained in a first phase relationship to start the rotation of the rotatable anode and in a second phase relationship to brake or stop the rotation.

In accordance with a further more limited aspect of the present invention, the capacitors are arranged in a relationship to the stator windings such that direct current is blocked to the main and auxiliary windings.

A first advantage of the present invention is that it accelerates the anode in the minimum amount of time with a minimum amount of heat input to the windings.

Another advantage of the present invention is that it allows for a lower supply line voltage.

Yet another feature of the present invention is the lowering of harmonic content of the winding currents, hence lowering the heat generated by the motor windings.

Still another advantage of the present invention resides in blocking of direct current which would overheat the stator windings in the event of a component failure.

Yet another advantage of the present invention resides in an automatic reduction of higher start voltages applied to bring the anode up to speed.

Still further advantages of the present invention will become apparent to those of ordinary skill in the art upon reading and understanding the following detailed description of the preferred embodiment.

BRIEF DESCRIPTION OF THE DRAWINGS

The present invention may take form in various parts and arrangement of parts or in various steps and arrangement of steps. The drawings are only for purposes of illustrating a preferred embodiment and are not to be construed as limiting the invention.

FIG. 1 is 1A a diagram illustration of a CT scanner incorporating a high-speed starter for an x-ray tube in accordance with the present invention;

DETAILED DESCRIPTION OF THE PREFERRED EMBODIMENTS

Figure 2A:
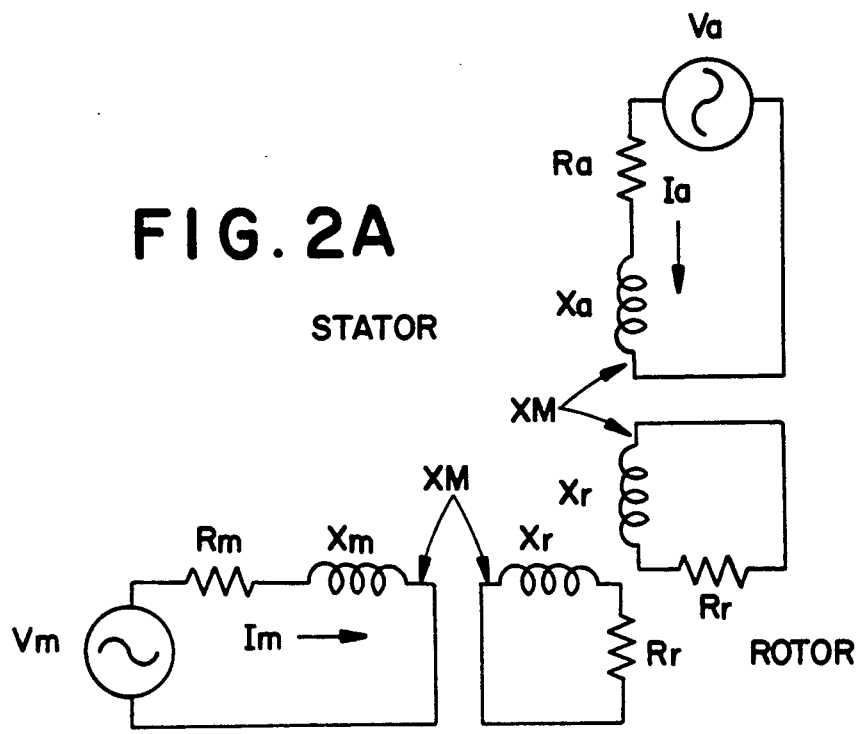
FIGS. 2A-D are schematics of a split phase induction motor in an unbalanced form and as a circuit with symmetrical components and equivalent circuits thereof.

With reference to FIG. 1, a CT scanner includes an x-ray tube lo which selectively projects a fan shaped beam 12 of penetrating radiation across an image circle 14 to impinge upon a radiation detection means, such as an array of detectors 16. A rotating means 18 selectively causes relative rotational movement of the radiation beam around the scanned circle. A control panel 20 enables the operator to select various system controls and events. Among the controls provided on the panel is a switch or means for the operator to initiate a CT scan, and means for selecting x-ray operating parameters including tube current and tube voltage. A central processor 22 controls the timing and operation of a high speed starter 24 for x-ray tube anode rotation and other system components.

With continuing reference to FIG. 1, prior to initiating a scan, the x-ray tube is in a standby mode. Upon commencement of are x-ray scan, the central processor 22 causes the x-ray tube to be brought up to a full, stable operating mode. Once the x-ray tube is generating the fan beam 12 in a stable manner, the rotating means 18 commences rotating the x-ray fan beam 12 A data acquisition means 30 collects x-ray intensity data from the x-ray detector 16. An image processor 32 reconstructs the acquired data into an image representation. The image representation may be displayed on a display means 34, stored on tape or disk or subjected to further processing.

Turning to the enlarged view A of FIG. 1, xrays are used generally herein to describe shortwave electromagnetic energy which can penetrate solid matter. The x-rays are produced when electrons are released, accelerated and then abruptly decelerated by impacting with appropriate material. This takes place in the vacuum of the x-ray tube 10. To release electrons, a filament or cathode means 40 is heated to an incandescence by passing electric current therethrough. The electrons are accelerated by a high voltage between an anode target 42 and the cathode 40. The accelerated electrons impinge upon the anode target 42, whereby they are abruptly slowed.

In high energy x-ray tubes, the anode target is rotated such that the electron beam constantly strikes a different portion to prevent thermal damage to the target. The x-ray tube envelope itself is generally made of a glass, but is enclosed in a protective casing, which is filled with oil to absorb the heat radiated from the anode, which heat is produced along with the x-rays by the impacting of the electrons with the anode target 42 The anode target 40 is rotated by magnetic interaction of a rotor 44 and stator 48, analogously to present day induction motors. Stators of conventional induction accelerate a rotor from a rest position. It has been found that suitable rotation of the rotor in x-ray tubes is accomplished with a two phase winding system. Accordingly, the stator 48 includes a main winding 50 and an auxiliary winding 52. The main winding 50 is driven by a signal applied across a first node 54 and a common node 56. The auxiliary winding 20 is driven by a signal applied across a second node 58 and the common node 56. Accordingly, voltages supplied by connection to the common node 56 are supplied to both windings.

In the present system, all three leads are actively driven to facilitate a high speed start of the rotor 44, which in turn governs rotation of the anode 42. The start signals are provided by the high speed starter circuit 24, the operation of which is expanded upon in conjunction with FIG. 3. It is to be appreciated that by reversing the phase relationships used to start rotation, braking of rotation is accomplished.

Figure 2B:
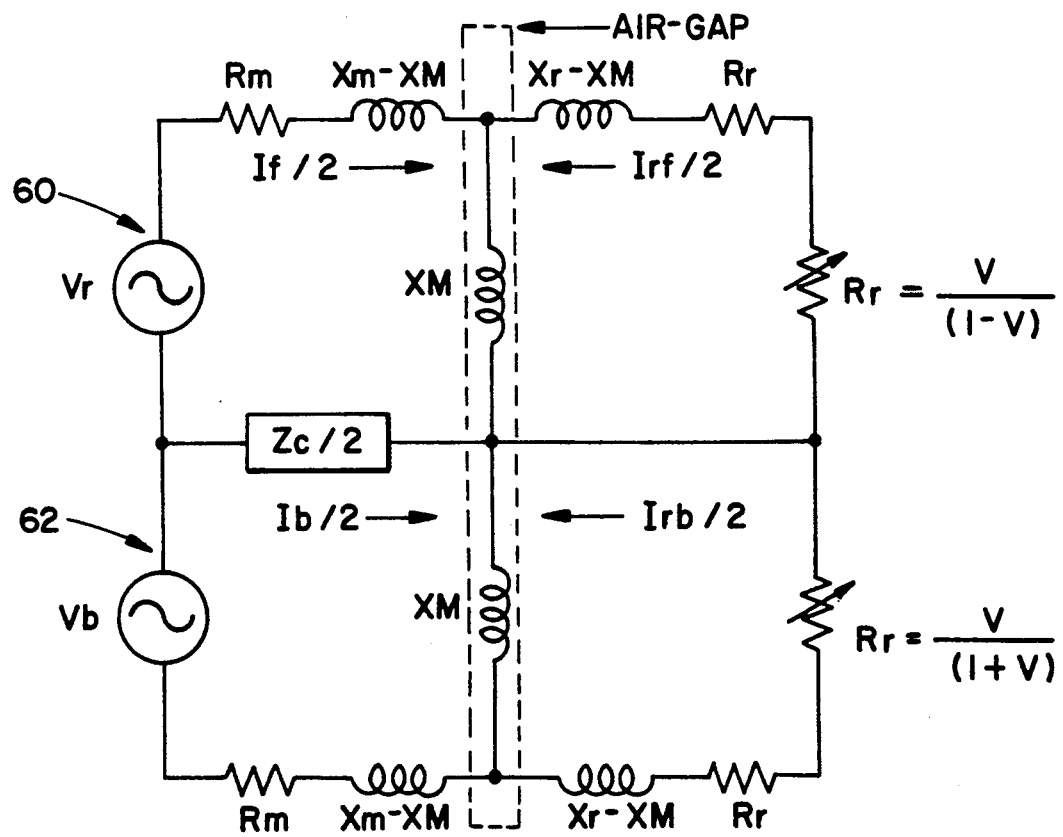
Figure 2C:
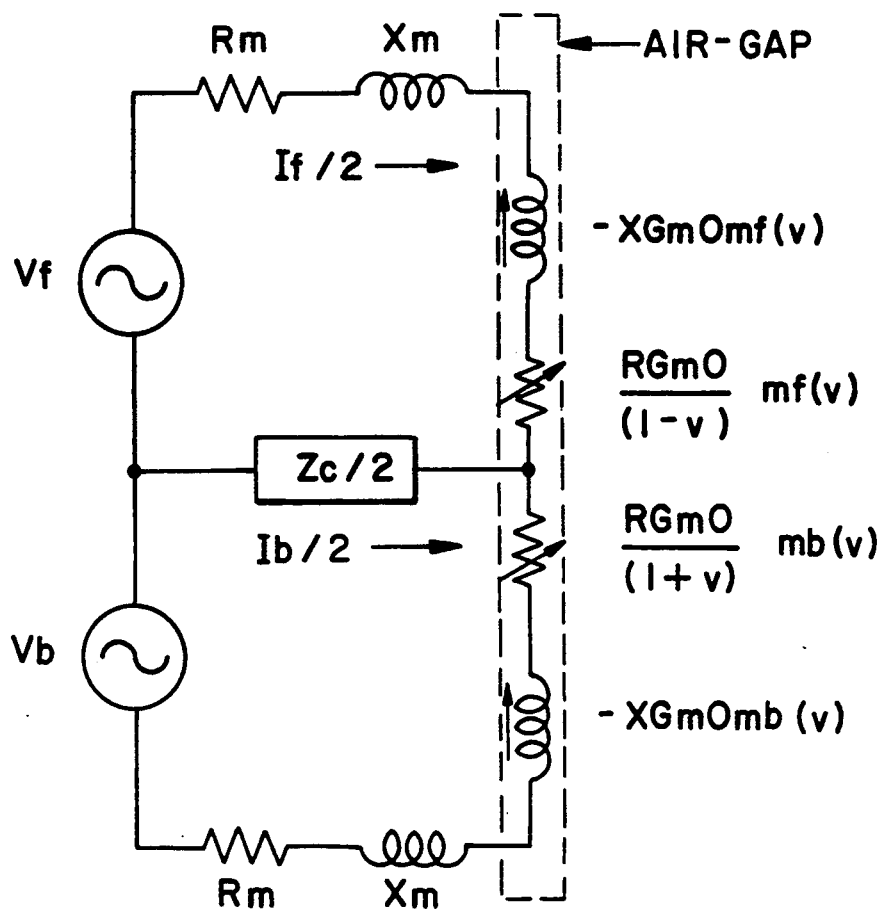

Turning now to FIG. 2A, a schematic of an unbalanced split-phase induction motor is shown. There is no simple equivalent circuit which can represent the performance of this unbalanced motor. However, by the use of symmetrical components, the unbalanced motor can be represented by two balanced motors, one running in a forward direction 60 and one in a backward direction 62 as shown in FIG. 2B. To maximize the efficiency of the starter, the torque developed by the backward motor 62 is reduced. This can be done by reducing both the backward voltage source $V_b$ and the common impedance $Z_c$ between the two motors 60, 62 as much as possible.

The backward voltage source $V_b$ is given by the equation $V_b = (V_m - j/a \times V_a)/2$. Where $V_m$ is the voltage applied to the main stator winding $X_m$, $V_a$ is the voltage applied to the auxiliary winding $X_a$, and "a" is the turns ratio between the main and auxiliary windings. Therefore, if a voltage applied to the auxiliary winding is "a" times as large and leads by 90° the voltage applied to the main winding, then the backward voltage $V_b$ of the equivalent circuit is 0. Additionally, the common impedance $Z_c$ between the forward and backward loops is given by: $Z_c = R_a/a^2 - R_m + j(X_z/a^2 - X_m)$. Where $R_m$ and $R_a$ include the copper resistances, and any added external resistances, of the stator main and auxiliary windings respectively. $X_m$ and $X_a$ are the self-reactance, including any added external reactance, of the main auxiliary windings.

Figure 2D:
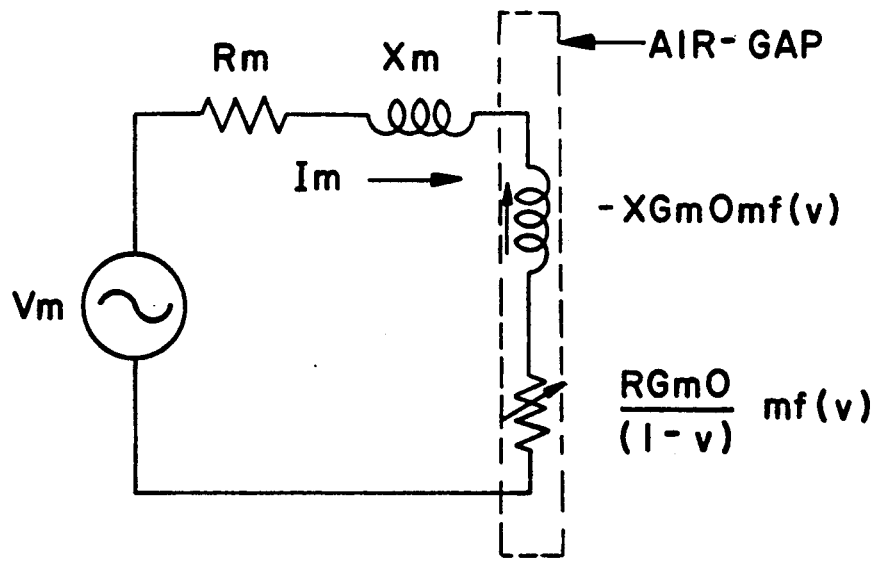

When the applied voltages and impedances are balanced, the circuit reduces to the circuit of FIG. 2D. The resulting equivalent circuit of FIG. 2D is a series inductance consisting of the self-reactance $X_m$ of the stator plus the gap reactance $X_{Gm}$ and a resistance consisting of the stator winding copper resistance $R_m$ plus the gap resistance $R_{Gm}$. In the above described L-R circuit, transferring of power is not efficient due to the presence of reactive volt-amps. This is a major drawback when attempting to employ an analogous type configuration in x-ray tube starters.

Figure 3:
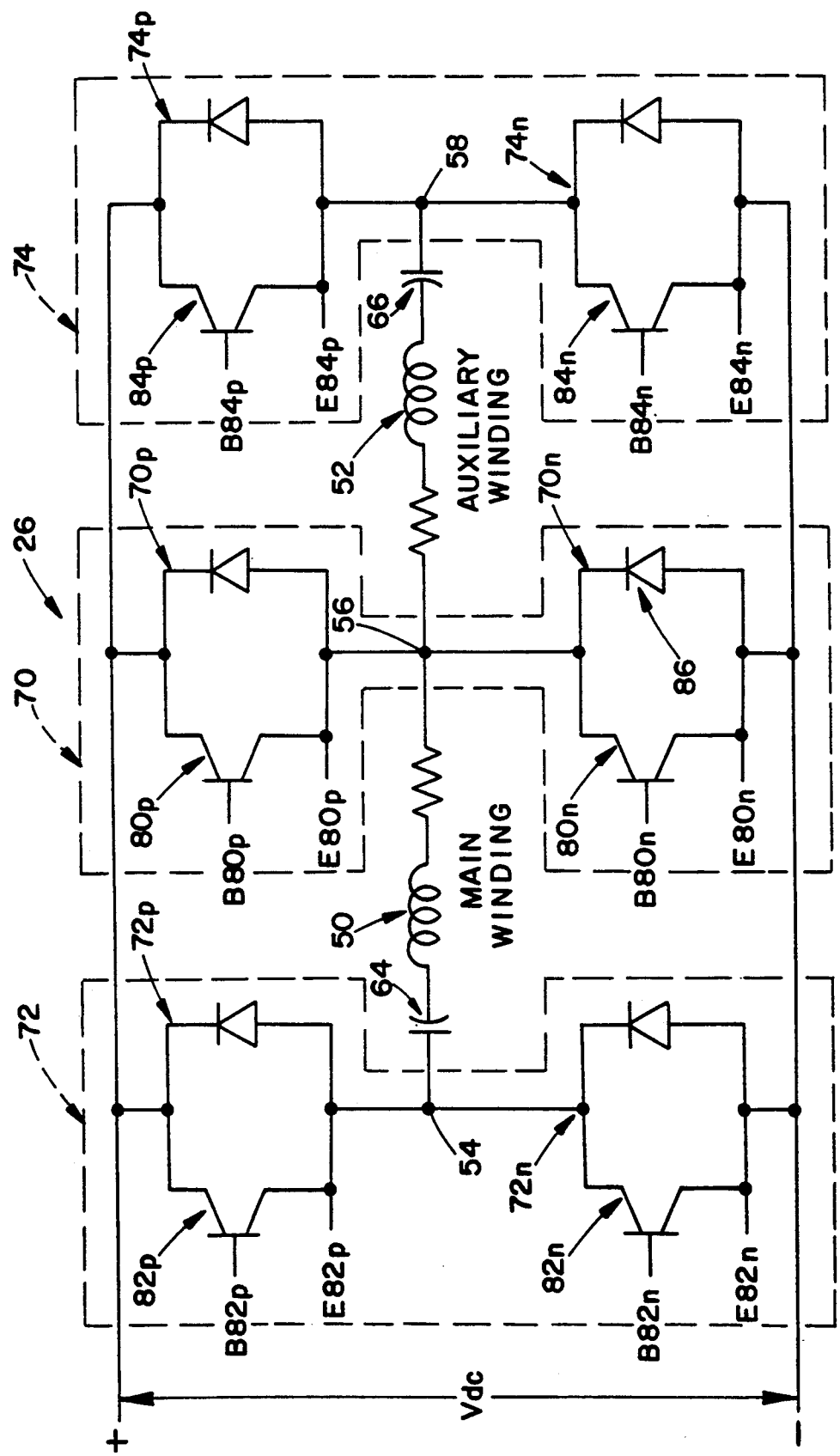
FIG. 3 is a schematic of the power drive circuit which is part of the high speed starter of the present invention.

Therefore, the present invention provides, as part of the high speed starter 24, a power drive circuit 26, as shown in FIG. 3, where the power factor of an L-R circuit can be improved by adding a capacitor 64 in series with the stator main winding 50 to cancel the equivalent series inductance. At the same time, a capacitor 66 which is $1/a^2$ as large is added in series with the auxiliary winding 52 to keep the common impedance low.

Figure 4A:
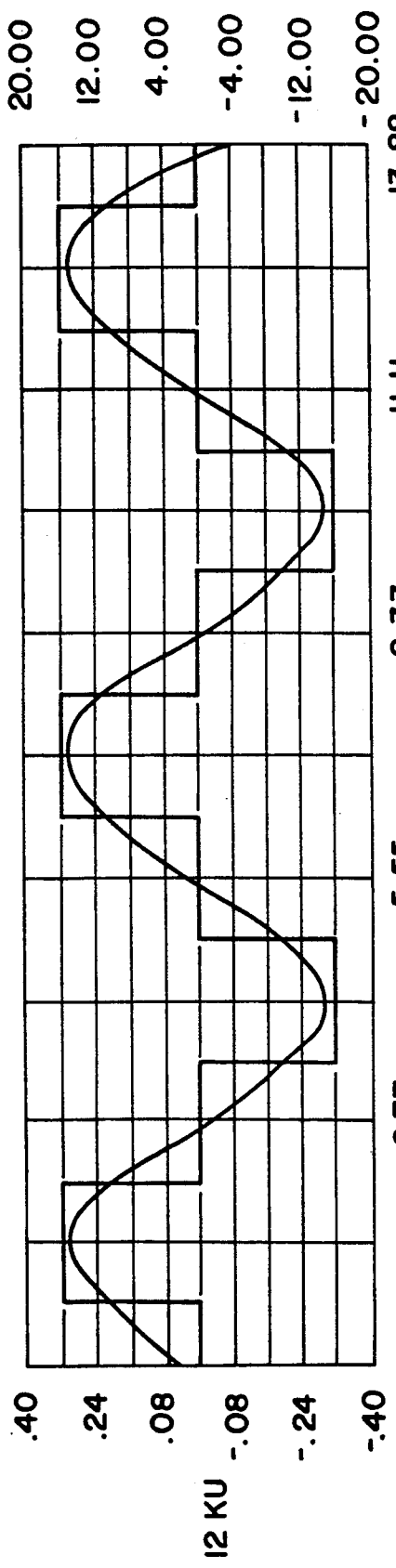
FIGS. 4A-B show a comparison of the required volt-amp input from the supply between a system including the series capacitors and a system excluding the series capacitors.
Figure 4B:
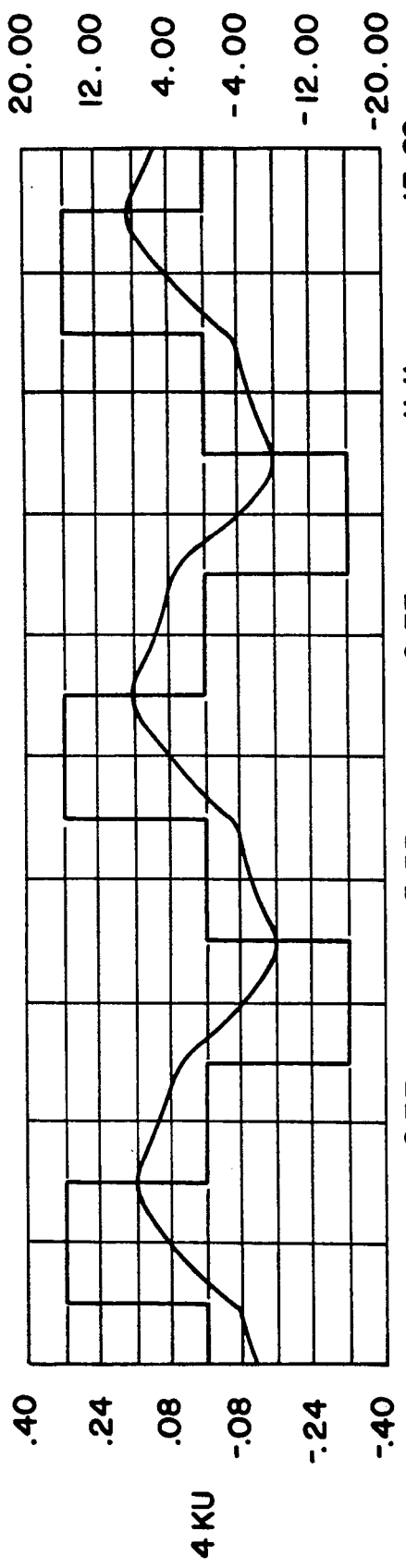

The addition of the two capacitors 64, 66 causes the two stator windings 50, 52 to appear almost resistive and present a near unity power factor load to the driving source. This reduces the required volt-amp input from the supply and greatly reduces the harmonic content of the winding current. FIG. 4B illustrates a computer simulation of the volt-amp input versus time in a system not including capacitors 64, 66 and FIG. 4A illustrates the reduced volt amp input in a system, such as the present, which does include capacitors 64, 66.

Returning to FIG. 3, the power drive circuit 26 includes a common signal supply means circuit 70 for supplying a common signal into the common node 56. A main node signal supply means or circuit 72 supplies a main signal to the first node 54. An auxiliary node signal supply means or circuit 74 supplies an auxiliary signal to the second node 58. Each of the signal supply means 70, 72, and 74 is further broken down into a positive signal portion and a negative signal portion. The common signal supply circuit 70 includes positive portion circuitry $70_p$ and negative portion circuitry $70_n$. The auxiliary signal supply circuit 74 includes positive portion $74_c$ and negative portion $74_n$. The main signal supply circuit 72 includes positive portion circuitry $72_p$ and negative portion circuitry $72_n$.

For compactness of explanation, the circuitry of $70_p$ is described in detail and it is to be understood that the description applies by analogy to like behaving circuits $70_n$, $72_p$, $72_n$, $74_p$, and $74_n$. The positive supply circuitry $70_p$ has a Darlington pair $80_p$–$80_n$ which is selectively forward and reverse biased. A bias voltage of an appropriate magnitude is selectively applied between its base $B_{80p}$ and its emitter $E_{80p}$. When the Darlington pair $80_p$–$80_n$ is "off" or in a reverse bias mode, conduction in the opposite direction may still occur through a rectification or diode means 86 which is in parallel to the emitter-collector junction of the Darlington pair of $80_p$–$80_n$. In this manner, current in main winding 50 and auxiliary winding 52 can still have a travel path after termination of conduction through a Darlington pair. As stated above, Darlington pairs $82_p$–$82_n$ and $84_p$–$84_n$ respectively corresponding to main signal supply circuit 72 and auxiliary supply circuit 74 function in the same manner.

Capacitors 64 and 66 are placed in series with the main and auxiliary windings, respectively. These capacitors act to cancel the equivalent inductances of the windings. The optimum ratio of the capacitors is equal to the square of the turns ratio of the respective windings.

Figure 5:
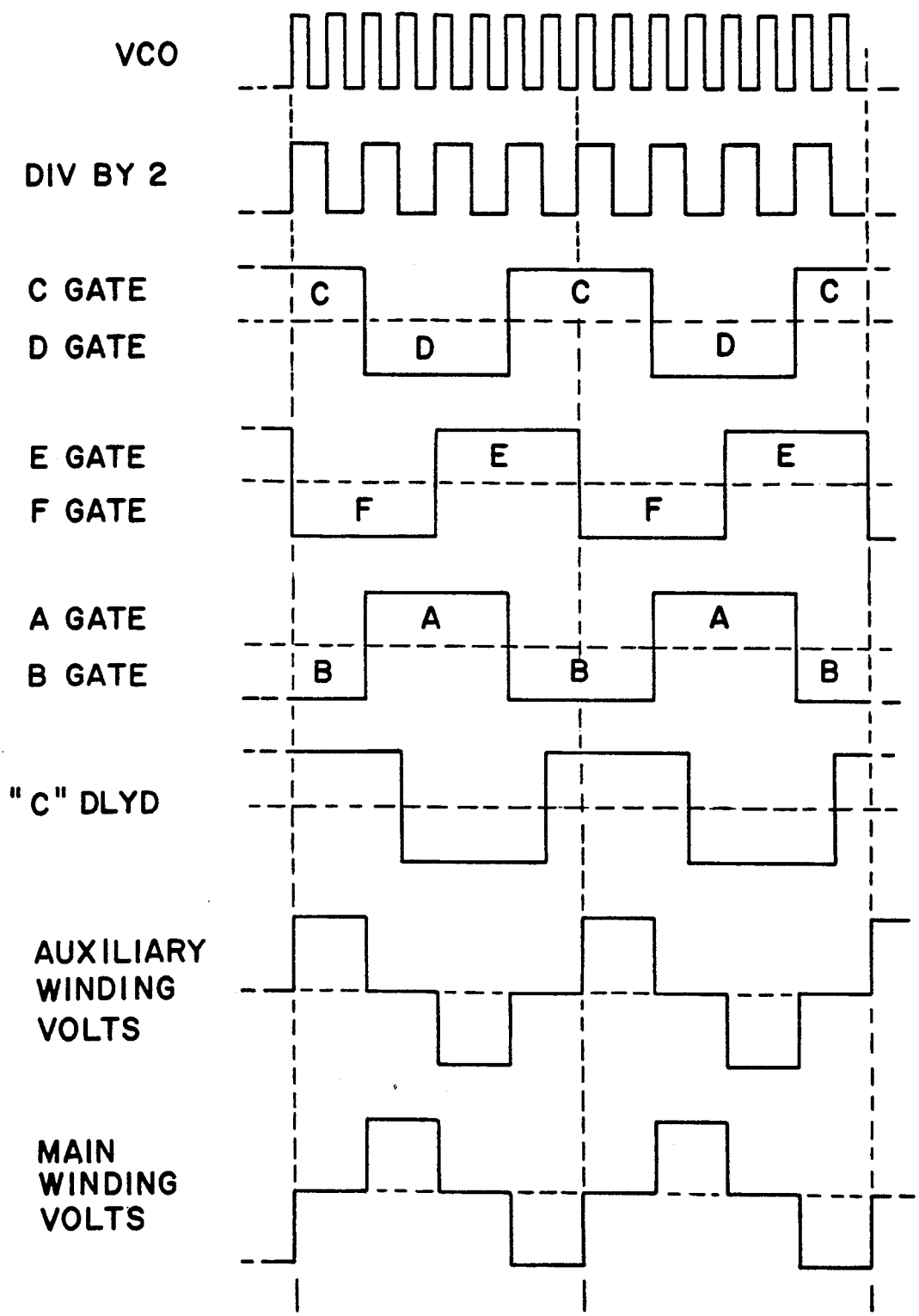
FIG. 5 are timing diagrams used to operate the present invention.

By applying bias voltage pulses with the appropriate timing and magnitudes to each Darlington pair of the high speed starter means 24, appropriate phasing and current pulses are provided through the stator windings. With reference to FIG. 5, the timing diagram shows the drive signals used to cancel the backward loop voltage source as discussed in conjunction with FIG. 3B so that the auxiliary voltage leads the main voltage by 90°. The timing signals of $82_p$, $82_n$ correspond to the transistors operating in main supply signal means 72, timing signals $84_p$, $84_n$ correspond to the transistors included in the auxiliary supply signal means 74, and timing signals $80_p$, $80_n$ correspond to the transistors operating in common supply signal means 70. Also, the voltage applied to the main winding is reduced by pulse width modulation (PWM) control to 1/a times the voltage applied to the auxiliary winding.

However, while the above configuration initially allows for a unity power factor, as the rotor speed changes gap reactance changes value and the series capacitors 62, 64 no longer completely cancel inductance looking into the windings. This problem is eliminated in the present starter 24 through the use of a control means or phase locked loop circuit 90 which is discussed in connection with one embodiment of the present invention shown in FIG. 6.

A control means similar to that used in the present invention is basically a non-inductive, tunable, active filter with an adjustable bandwidth. A common control means of this type will include a voltage controlled oscillator (VCO), phase detector and loop filter. When the phase difference between the VCO and an input signal is constant, the phase of the signals are maintained. If either the input or a reference signal, or the VCO output, changes in phase, the phase detector and filter produce a DC error signal that is proportional in magnitude and polarity to the original phase change. This error voltage changes the VCO phase, so that it again locks into the reference signal.

In the preferred embodiment, the control means 90 reduces the drive frequency as the rotor comes up to speed, thereby maintaining a near unity power factor as the rotor changes speed. The control means 90 reduces the drive frequency to maintain winding current in phase with winding voltage. When the speed of the rotor is the same as the drive frequency, the control means 90 stops reducing the drive frequency. Therefore, detection of desired rotor speed is accomplished simply by detecting when the drive frequency is no longer decreasing.

Figure 6:
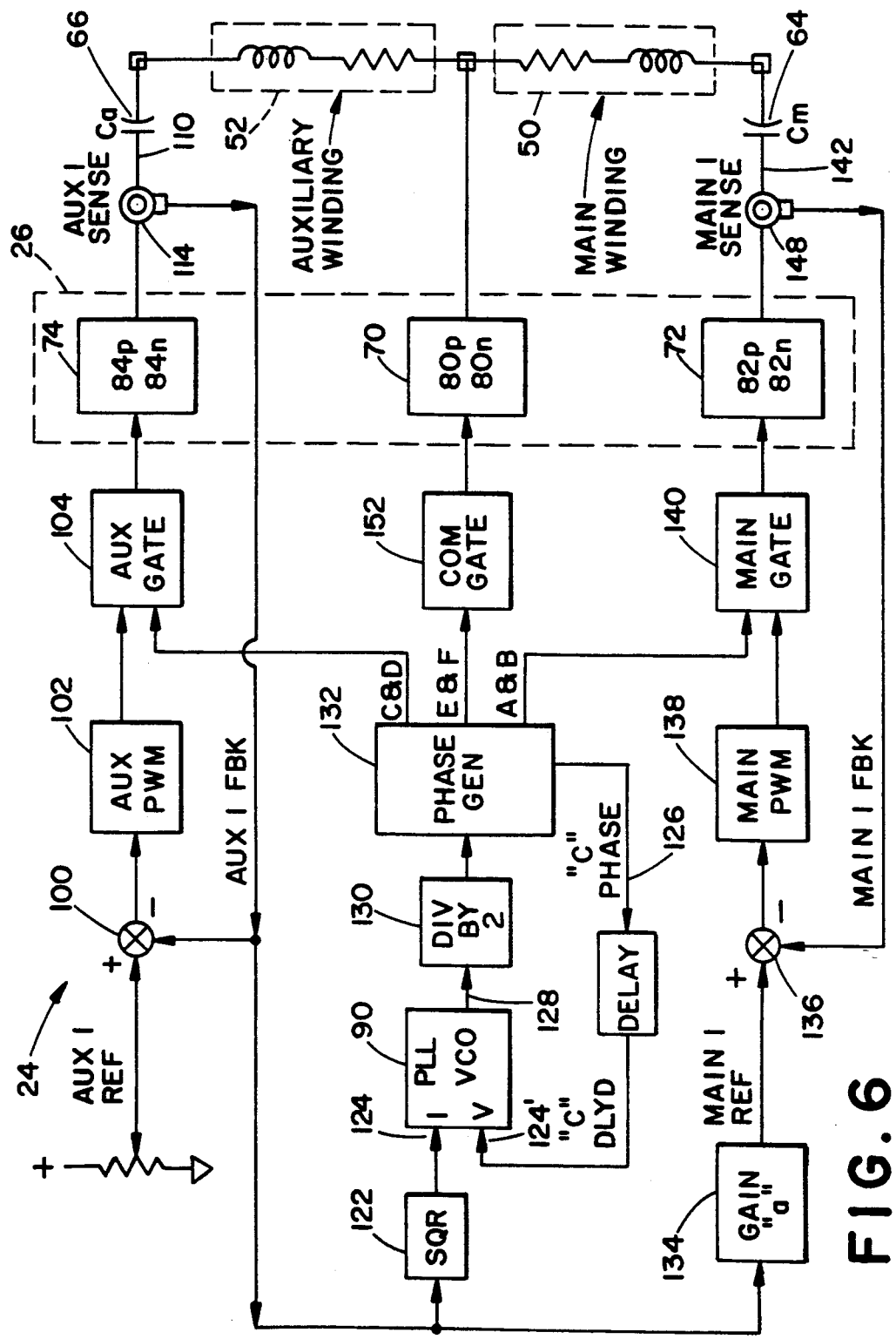
FIG. 6 is a block diagram of the x-ray tube high speed starter.

As shown in the embodiment of the starter in FIG. 6, during a high speed start of the rotatable anode, a maximum voltage reference enables an auxiliary current to flow to an auxiliary summing point 100. This causes an auxiliary pulse width modulator 100 to send full width pulses to an auxiliary gate 104. During the time that the auxiliary gate 104 is enabled, a full pulse width drive signal is sent to the auxiliary winding power transistors $84_p$ and $84_n$ of auxiliary supply signal means 74 which cause the $84_p$–$84_n$ output pulses shown in FIG. 5. This connects DC rails 110 to the auxiliary winding 52 through an auxiliary current sensor 114 and the capacitor 66. An auxiliary current feedback signal line 118 delivers a feed back signal to the auxiliary summing point 100 for use during rotor run conditions. The summing point 100 subtractively combines the feedback signal with the auxiliary current signal and adjusts the pulse width modulation in accordance with the difference, i.e. the difference between the actual and selected anode speeds.

The feedback signal carried on the auxiliary feedback line 11s also acts as the input to the control means or phased locked loop circuitry 90. Initially, the feedback signal is squared by the squaring circuitry 122 and is then applied to a first input 124 of the control means. A "C" or common phase signal 126, delayed by one pulse, is in phase with the voltage applied to the auxiliary winding 52 This signal is applied to a second input 124' of the control means 90. A voltage control oscillator 128 of the control means provides output pulses which pass through a divide by two circuit 130 and a phase generator 132. The pulses are adjusted in frequency by the control means 90 to maintain the auxiliary current feedback signal in phase with the auxiliary winding drive voltage.

The auxiliary current feedback signal at signal line 11s is also sent to a main pulse width modulator 138. The signal is first multiplied by the turns ratio "a" of the main and auxiliary windings by a gain circuit 134. It then acts as the reference for a circuit arrangement having components analogous to those used in conjunction with the auxiliary winding, i.e. summing junction 136, main pulse width modulator 138, a main gate 140 and main supply signal means 72. The main winding power transistors $82_p$–$82_n$ of the main supply signal means 72, produce output pulses as shown in FIG. 5 to connect a DC rail 142 to the main winding 50 through a main current sensor 148 and the main capacitor 64. The auxiliary gate 104, the main gate 140, and a common gate 152 are all supplied with the pulses from the voltage controlled oscillator 128 of the control means 90. The common line is connected to the windings through the Darlington pair power transistors $80_p$–$80_n$ of the common supply signal means 70.

Figure 7:
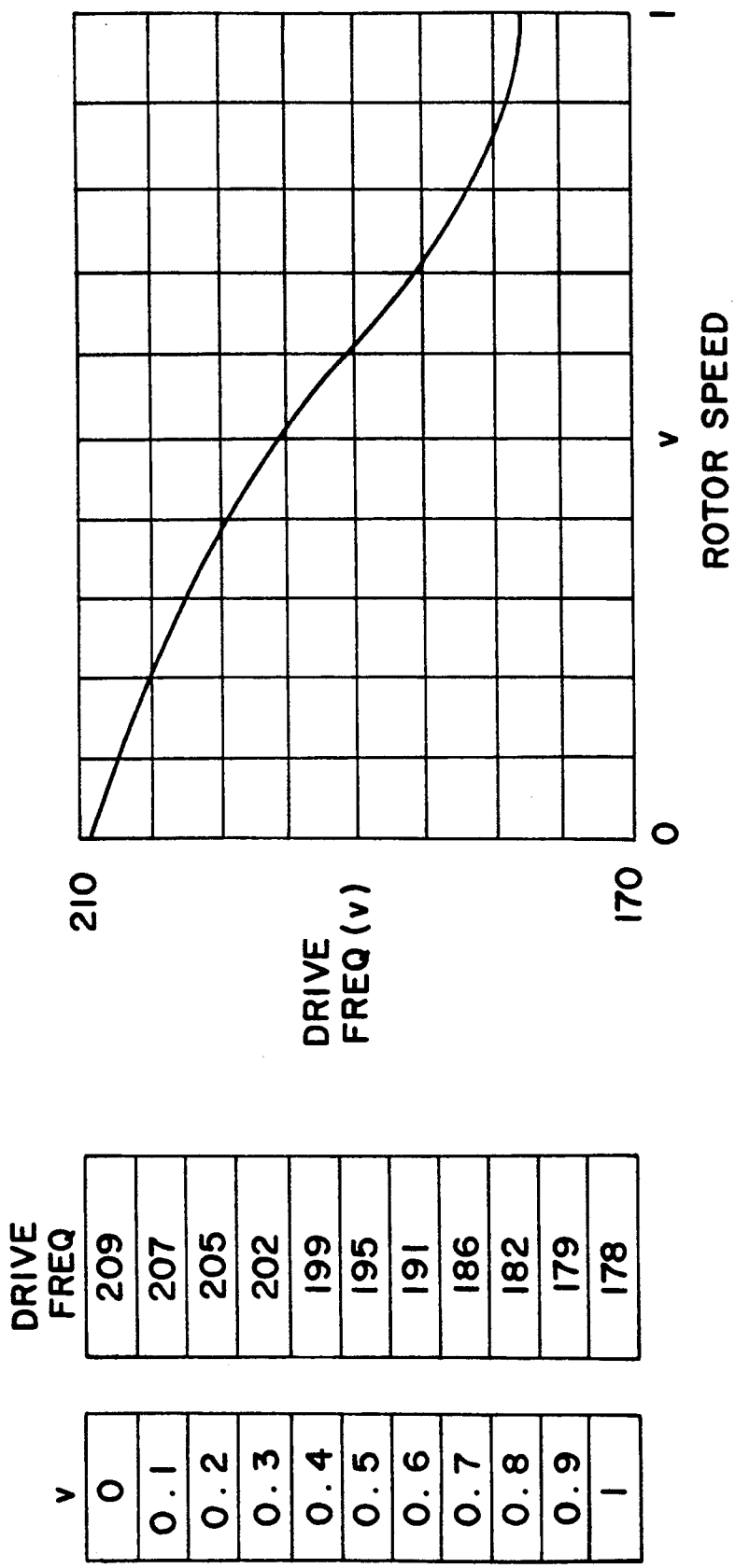
FIG. 7 shows the action of the phased locked loop circuit reduction of the drive frequency as the rotor comes up to speed.

Through control of the main winding to "a" times greater than the current in the auxiliary winding, the voltage applied to the main winding is automatically controlled to "a" times less than the voltage applied to the auxiliary winding. This ensures the proper voltages to the two windings cancelling out the backward rotating loop voltage. As previously stated, as the equivalent inductance of the stator increases the external capacitors 64, 66 no longer cancel the equivalent inductance and the total reactance looking into the stator becomes inductive. This causes the stator current to lag the applied voltage and the load is no longer at unity power factor. To correct this, and as is shown in FIG. 7, the control means or phase locked loop 90 lowers the drive frequency as the rotor speed increases until the rotor speed reaches a selected speed.

The feature of the present invention to start the rotation of the rotor at a high speed and to analogously brake at a high speed minimizes the time in which the rotating x-ray tube resonates mechanically. Mechanical resonating at various frequencies causes an x-ray tube to lose bearing life and focal spot motion. In diagnostic imaging such as computed tomography or digital radiography, focal point motion degrades the resultant images. With the present invention, the short time in which it is required to start the rotation of the rotating anode avoids long durations of resonant rotation frequencies.

The invention has been described with reference to the preferred embodiment. Obviously modifications and alterations will occur to others upon reading and understanding the preceding detailed description of the preferred embodiment. It is intended that the invention be construed so as to include all such modifications and alterations insofar as they come within the scope of the appended claims or equivalents thereof.

Having thus described a preferred embodiment, the invention is now claimed to be:

1. A radiographic diagnostic apparatus comprising:
   a power supply for providing AC main and auxiliary currents;
   a cathode means for generating electrons;
   an anode means rotatably disposed in a path of electrons generated form the cathode means for generating ionizing radiation in response to impacting electrons;
   a means for directing the ionizing radiation through a subject receiving region;
   a means for receiving radiation that has passed through the subject receiving and producing diagnostic information indicative thereof;
   an induction rotor operatively connected to the anode means;
   a stator means for inducing rotation of the rotor, the stator including a main winding through which the main current passes and an auxiliary winding through which the auxiliary current passes;
   a main capacitor in series with the main winding, the main capacitor reducing inductance of the stator means such that the main winding appears essentially resistive and presences a near unity power factor load to the power supply;
   an auxiliary capacitor placed in series with an auxiliary winding, the auxiliary capacitor maintaining a selected impedance of the stator means, such that the auxiliary winding appears essentially resistive and presents a near unity power factor load to the power supply;

a control means for controlling the main current and the auxiliary current passed to the main winding and the auxiliary winding, respectively, such that as rotor rotation is altered, the near unity power factor load of the respective windings presented to the driving source is maintained.

2. The radiographic diagnostic apparatus claimed in claim 1 further including a sensing means for sensing a preselected speed of the rotatable anode.

3. The radiographic diagnostic apparatus claimed in claim 1 wherein the control means is a phase locked loop circuit.

4. A high speed starter for starting rotation of an anode in an x-ray tube that includes an inductive rotor connected to the anode and at least a main stator winding and an auxiliary stator winding, the high speed starter comprising:

a main capacitor means in series with the main winding for reducing its inductance;

an auxiliary capacitor means in series with the auxiliary winding for maintaining a selected impedance; and, a control means for controlling a frequency of a main current through the main series connected winding and main capacitor means and an auxiliary current through the series connected auxiliary winding and auxiliary capacitor means such that as rotation of the anode means increases, the control means lowers the frequency of the main current and the auxiliary current.

5. A high speed starter for binding rotation o an anode in an x-ray tube up to an operating rotational speed quickly, the x-ray tube including an inductive rotor connected to the anode and at least a main stator winding and an auxiliary stator winding, the high speed starter comprising:

a main capacitor means connected electrically in series with the main winding for reducing the main winding's inductance;

an auxiliary capacitor means connected electrically in series with the auxiliary winding; and, a control mans for controlling a main current through the main winding and the auxiliary current through the auxiliary winding such that as rotation of the anode is increased, the control means lowers the frequency of the main current and the auxiliary current, the control means including means for providing (i) a first phase relationship between the main current and the auxiliary current to start rotation and (ii) a second phase relationship to brake rotation.

6. The high sped starter as claimed in claim 4 wherein one of the main and auxiliary capacitor means has a net capacitance that is $1/a^2$ as large as the capacitance of the other, where "a" is a turns ratio between the amion and the auxiliary windings.

7. A high speed starter for starting rotation of an anode in an x-ray tube that includes an inductive rotor connected to the anode and at least a main stator winding and an auxiliary stator winding, the high speed starter comprising:

a main capacitor means in series with the main winding for reducing its inductance;

an auxiliary capacitor means in series with the auxiliary winding such that a selected impedance exists in the windings;

a control means for controlling a min current through the series connected main winding and capacitor means and an auxiliary current through the series connected auxiliary winding and capacitor mean such that as rotation of the anode increases, the control means lowers the frequency o the main current and the auxiliary current and, a sensing means for sensing a variation between a speed of rotation of the rotor and a drive frequency of the main and auxiliary currents, the sensing means sensing relative phase changes of at least one of the main and auxiliary currents.

8. The high speed starter as claimed in claim 4 wherein the main and auxiliary capacitors are connected with the main and auxiliary stator windings such that direct current is blocked to the main and the auxiliary windings.

9. A method of controlling rotation of a rotating anode of a radiographic tube, which anode is rotated by inductive interaction of an induction rotary with first and second windings, the method comprising:

(a) generating a drive signal from an AC power supply having a selectable frequency;

(b) generating a main signal having a first phase relation to the drive signal;

(c) generating a common signal having a second phase relation to the drive signal;

(d) generating an auxiliary signal having a third phase relation to the drive signal;

(e) combining the main signal and the common signal to form a first winding signal;

(f) combining the auxiliary signal and the common signal to form a second winding signal;

(g) coupling the first winding in series with a first capacitance, the first capacitance cancelling series inductance such that the first winding appears essentially resistive and as a near unity power factor load to the power supply;

(h) coupling the second winding in series with a second capacitance, the second capacitance maintaining an impedance of the series connected second winding and second capacitance within a selected range such that the second winding appears essentially resistive and as a near unity power factor load to the driving source;

(i) applying the first winding signal to the first winding;

(j) applying the second winding signal to the second winding; and (k) reducing the drive signal frequency as rotor rotation increases toward a predetermined speed such that the near unity power factor is maintained.

10. The method of claim 9 further including the step of:

detecting an end o the reducing of the drive frequency, whereby the end of such reducing signifies full speed rotation.

11. A high speed starter for staring rotation of an induction rotor that is magnetically coupled with first and second stator windings in an un-balanced single phase induction motor configuration, the starter comprising:

a first capacitance means in series with the first stator winding;

a first reference voltage means for passing a first drive signal with a selectable frequency through the series connected first stator winding and first capacitance means;

a second capacitance mean in series with the second stator winding;

a second reference voltage means for passing a second drive signal with a selectable frequency through the series connected second stator winding and second capacitance means, the second drive signal being 1/a times smaller and leading substantially 90° ahead of the first drive signal, "a" being a turns ratio of the first and the second windings; and a control means for controlling the first and the second drive signal frequencies such that as rotor rotation speed increases, the control means lowers the first and second drive signal frequencies.

12. The high speed starter as set forth in claim 11 further including a sensor means for sensing an equality between the first and second drive signal frequencies and a speed of the induction rotor wherein once the equality is sensed further decrease in the drive frequency is halted.

13. The high speed starter as set forth in claim 11 wherein the control means includes a voltage control oscillator for producing adjustable pulses which maintain a second feedback signal in phase with the second drive frequency.

14. The high speed starter as set forth in claim 12 wherein the control means includes a phase locked loop circuit.

* * * * *